United States Patent Office 3,509,019
Patented Apr. 28, 1970

3,509,019
DIALLYL PHTHALATE DECORATIVE LAMINATES
Harry H. Beacham, Severna Park, Md., assignor to FMC Corporation, New York, N.Y., a corporation of Delaware
No Drawing. Filed May 16, 1967, Ser. No. 638,765
Int. Cl. B32b 27/10
U.S. Cl. 161—251                15 Claims

ABSTRACT OF THE DISCLOSURE

This specification discloses diallylic phthalate resin decorative laminates with improved mar and abrasion resistance and improved bond strength between the resin layer and the substrate. These laminates are prepared by impregnating an unpigmented fibrous carrier sheet with a diallylic phthalate resin solution, drying the resin impregnated carrier sheet to a tack- and volatile-free state, and then laminating this overlay sheet to the top surface of the decorative layer. The improved properties are obtained by using as the impregnating solution for the overlay sheet a diallylic phthalate resin solution which comprises (a) diallylic phthalate, 85–100% by weight of the diallylic phthalate being partial polymer and the remaining 0–15% being monomer, (b) a catalytic amount of organic peroxide, (c) a volatile solvent, and (d) a small amount of a simple mixture of an alkylated methylol melamine and certain alcohols containing 1–3 hydroxyl groups.

BACKGROUND OF THE INVENTION

Field of the invention

Diallylic phthalate decorative laminates with improved abrasion and mar resistance in which the decorative layer is a wood veneer.

Description of the prior art

Diallylic phthalate resin decorative laminates are of three basic types: those in which the decorative layer is a resin-impregnated decorative sheet, a printed ground coat, or a wood veneer. These laminates are prepared by impregnating an unpigmented fibrous carrier sheet with a diallyl phthalate resin solution, drying the resin-impregnated carrier sheet to a tack- and volatile-free state, and then laminating this overlay sheet to the top surface of the decorative layer. By far the most important of these decorative laminates are the ones in which the decorative layer is a wood veneer.

In general the decorative laminate field is dominated by melamine-formaldehyde resins. These resins can be used to prepare tack-free resin-impregnated carrier sheets for laminate production and have the advantage that they are relatively inexpensive. Attempts have been made to use these resins in the preparation of decorative laminates containing a wood veneer as the decorative surface. However, these attempts have not been successful since the laminating pressures required to cure these resins crush the wood veneer thus causing a loss in the aesthetic quality known as "depth" which is absent from imitation wood laminates.

In Patent No. 3,108,030, B. S. Taylor describes the method of preparing diallyl phthalate resin decorative laminates containing a natural wood veneer as the decorative layer. However, in the practice of that invention various problems have been encountered. It has been found that the interlaminar bond between the resin-impregnated overlay sheet and the wood veneer is inferior to the bond obtained in other types of diallyl phthalate decorative laminates. The inferiority of this bond is evidenced by flaking of resin from the surface of the laminate when it is cut with a sharp knife in a closely lined crosshatch pattern. It has also been found that the mar resistance of these laminates is not as good as that of other diallyl phthalate decorative laminates. Diminished mar resistance is evidenced by the formation of a permanent white mar when the surface of the laminate is scraped heavily with a blunt object such as the edge of a coin.

The use of melamine formaldehyde resins to modify cellulose for use with diallyl phthalate has been suggested. U.S. Patent 2,809,911 discloses the modification of polyester solutions, optionally containing diallyl phthalate monomer, with a melamine-formaldehyde resin solution. U.S. Patent 2,562,140 describes a melamine-urea-formaldehyde glue line for a wood veneer-gelled diallyl phthalate laminate. U.S. Patent 2,757,160 describes the modification of cellulose with formaldehyde condensates, amines, and particularly aminotriazines to render cellulose more compatible with diallyl phthalate. The modification of cellulose with amine-aldehyde condensates to improve bonding of diallyl phthalate to cellulose is generally known. However, the art does not disclose a practical method for rendering wood veneer capable of forming a firm bond to a clear diallyl phthalate overlay in a decorative laminate.

Copending U.S. Patent applications Ser. Nos. 427,128 and 427,082, disclose diallylic phthalate laminates with improved mar resistance which are obtained by using 0.1 to 10% by weight of diallyl melamine plus poly(loweralkylated methylol) melamine or poly(allyated methylol) melamine alone. The diallyl melamine is costly, has only limited solubility in acetone and it imparts a distinct yellow hue to the laminate. The poly(lower-akylated methylol) melamine and poly(allylated methylol) melamine are preformed prior to use. The poly(lower-alkylated methylol) melamine does not work alone; it must be used with diallyl melamine to obtain both adhesion and mar resistance. Poly(alkylated methylol) melamine performs both functions but is not available commercially. Poly-(methyl methylol) melamine, an example of poly(lower-alkylated methylol) melamine is available commercially as Cymel 300 (American Cyanamid Co.) at a modest price.

SUMMARY OF THE INVENTION

I have now discovered that wood veneer decorative laminates with improved mar and abrasion resistance and improved bond strength between the resin and the wood veneer can be obtained by using an overlay sheet saturated with an impregnating solution comprising a diallylic phthalate resin solution which comprises (a) diallylic phthalate, 85–100% by weight of said diallylic phthalate being partial polymer and the remaining 0–15% being monomer, (b) a catalytic amount of organic peroxide, (c) a volatile solvent, (d) 0.1–10% by weight based upon the diallylic phthalate of poly(alkylated methylol) melamine, and (e) 0.5–5% by weight based on the diallylic phthalate, of certain lower alkyl compounds having 1–3 hydroxyl groups. The presence of poly(alkylated methylol) melamine achieves good bonding between the impregnated overlay sheet and the veneer but the cured laminates have poor mar resistance. Quite surprisingly the presence of a small amount of an alcohol containing 2–7 carbon atoms, ethylene glycol, propylene glycol or glycerine improves the delamination resistance of the cured laminate and also improves the mar and abrasion resistance of the cured laminate.

The fibrous carrier sheet impregnated in accordance with this invention may be either a paper or a non-woven fabric. Suitable fibrous materials for making these sheets include polyacrylonitrile, alpha-cellulose, rayon and cotton. The fibers may be of any suitable length. Papers are generally made from fibers less than about 1 inch in length, while non-wovens are generally prepared from fibers at least about ½ inch in length.

The thickness of the carrier sheet may vary from about 2–10 mils, and usually will be about 4–7 mils. Papers generally have a thickness of about 2–8 mils, while non-wovens are generally about 3–10 mils. The denier of the fiber is not critical and generally will be in the range of about 1–5. The basis weight of the carrier sheet will generally be about 10–14 pounds per 3000 square feet, and preferably about 15–30. The carrier sheet should be unpigmented and preferably color-free, although printed or tinted carrier sheets may be used to produce unusual decorative effects, if desired.

DESCRIPTION OF THE PREFERRED EMBODIMENTS

The major resinous component of the overlay sheet is derived from diallylic phthalate. By "diallylic phthalate" we mean diallyl, dimethallyl esters of ortho-, iso- and tere-phthalic acids. Diallylic phthalates polymerize by addition polymerization through the allylic unsaturation, first forming an acetone-soluble, fusible, essentially linear partial polymer of relatively low molecular weight containing residual unsaturation. On further polymerization this partial polymer is crosslinked to an infusible, insoluble thermoset resin having excellent physical and chemical properties.

Diallylic phthalate partial polymers may be prepared by standard polymerization techniques, such as emulsion, solution or bulk polymerization, usually with a peroxide catalyst, as described by Pollack et al. in U.S. Patent 2,273,891. A preferred method for conducting this polymerization is described by C. A. Heiberger in U.S. Patent 3,096,310.

As the diallylic phthalate polymerization reaction is allowed to proceed, the viscosity of the medium increases slowly at first, and then rapidly as the gel-point of the polymer is aproached. The reaction is terminated before gelation occurs, normally at about 25–35% conversion of monomer to partial polymer. The polymerization may be terminated by any standard procedure such as lowering the temperature, adding a solvent for the monomer which precipitates the partial polymer, or adding a polymerization inhibitor. The product of this polymerization is a solution containing partial polymer dissolved in monomer. The partial polymer is separated from monomer and residual solvent by known procedures, such as by stripping off volatile components, or dissolving the monomer in an appropriate solvent.

Diallylic phthalate partial polymers are linear or slightly branched, solid polymers containing residual unsaturation. The number average molecular weight of the partial polymer is generally less than about 25,000, and usually below about 10,000. These partial polymers are generally characterized by their precipitated polymer viscosity which is measured as a 25% solution of partial polymer in diallyl phthalate monomer at 25° C. The precipitated polymer viscosity is generally in the range of about 100–1000 centipoises, and preferably about 200–700 centipoises.

The addition of 1–3% of a lower alcohol containing 2–7 carbon atoms, and preferably 2–6 carbon atoms, ethylene glycol, propylene glycol or glycerine in combination with 0.1–10% of an alkylated methylol melamine in the diallylic phthalate impregnating solution improves the mar resistance of the cured laminates prepared from overlays impregnated with these solutions. The preferred alcohols for use in this invention are selected from the group consisting of ethanol, isopropanol, n-propanol, n-butanol, allyl alcohol, n-hexanol, propylene glycol, ethylene glycol and glycerine. Higher alcohols such as octyl give no improvement in mar resistance in the cured laminates and additionally higher alcohols cause a loss in the bond strength between the resin layer and the wood veneer. Methanol improves the mar resistance of diallylic phthalate laminates but adversely affects the bond strength.

Overlay sheets are prepared in accordance with this invention by impregnating the fibrous carrier sheet with a solution containing (a) diallylic phthalate, about 85–100% by weight of the diallylic phthalate being partial polymer and the remaining about 0–15% being monomer, (b) about 0.1–10% by weight based upon the diallylic phthalate of poly(lower-alkylated methylol) melamine, (c) a catalytic amount of an organic peroxide, (d) a volatile organic solvent, and (e) 1–5% by weight based on the diallylic phthalate of an alcohol containing 1–7 carbon atoms, ethylene glycol, propylene glycol or glycerine, and drying the impregnated overlay sheet.

At least about 85% of the diallylic phthalate present in the impregnating solution should be present as partial polymer and the remaining about 0–15% as monomer. Preferably, the monomer is present in an amount of about 5–10% to facilitate escape of volatile solvent from the resin surface during drying, and to improve resin flow during lamination. If more than about 15% of the diallyl phthalate is monomer, the dried overlay sheet will generally be sticky and hard to handle.

The impregnating solution should also contain a catalytic amount of an organic peroxide to catalyze the final cure of the resin. There is no advantage in using more than about 5% by weight of peroxide, based on the diallylic phthalate, while at least about 0.5% is required for complete cure. Preferably, the peroxide is present in an amount of about 2–3%. Useful peroxides include diacyl peroxides such as benzoyl peroxide, p-chlorobenzoyl peroxide, 2,4-dichlorobenzoyl peroxide, lauroyl peroxide and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-dimethylhexane-2,5-di(peroxybenzoate), di-tert.-butyl diperphthalate, tert.-butyl peracetate, tert.-butyl peroxyisobutyrate and isopropyl percarbonate, as well as many other organic peroxides which have been described in the literature.

Generally, the impregnating solution also contains about 2–5% by weight based on the diallylic phthalate of an internal release agent such as lauric acid, carnauba wax or beeswax. However, external release agents or other processing techniques may also be used instead of an internal release agent.

The impregnating solution is prepared by dissolving all of these components in a volatile organic solvent, which may be any of the conventional solvents useful for dissolving diallylic phthalate partial polymers. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, and many other solvents which can be evaporated after impregnation of the carrier sheet. Since the viscosity of the impregnating solution and the rate at which the solvent will evaporate, will vary with each particular solvent, the choice of solvent will depend to some extent upon the processing techniques used in preparing the overlay sheet. In some cases it may be desirable to use a mixture of solvents.

The impregnating solution should contain enough solvent to provide thorough impregnation of the carrier sheet, while at the same time having a resin content sufficient to provide the desired resin pickup during impregnation. The resin content of the impregnating solution may vary from about 25–70%, depending on the particular solvent system used. It is especially convenient to operate in the range of about 30–50% resin content for most solvents.

The fibrous carrier sheet should be impregnated to a resin-forming material pickup of about 70–90% by weight of the dried, impregnated overlay sheet, and preferably about 75–85%. When the carrier sheet is impregnated to less than about 70% pickup, there is insufficient resin-forming material present and the resulting overlay contains resin-starved areas in which the fibers at the surface are not completely covered with resin. On the other hand, when the carrier sheet is impregnated to more than about 90% pickup, there is insufficient reinforcing fiber present, and the overlay sheet is susceptible to checking and cracking.

The carrier sheet may be impregnated with resin using conventional equipment and techniques, wherein the sheet is passed through or dipped into a tank containing the impregnating solution. The amount of resin pickup may be controlled by adjusting the rate at which the carrier sheet is passed through the solution, varying the solvent and the resin content of the impregnating solution, or using metering rolls, doctor blades, transfer rolls or other standard saturating equipment. The impregnation is conveniently carried out at room temperature, followed by evaporation of the solvent at elevated temperatures. The resin-forming material content of the carrier sheet is readily determined by weighing a sample of untreated carrier sheet and a sample of dried, impregnated carrier sheet and expressing the difference as the amount of resin-forming material on the carrier sheet.

After the desired resin pickup has been obtained on the carrier sheet, the sheet is dried to remove the volatile solvent. The drying conditions should be carefully controlled to remove nearly all of the volatiles present while avoiding premature curing of the resin. The drying temperature and time will, of course, depend on the amount of solvent present, the particular solvent used, and the speed at which the impregnated sheet is passed through the drying oven. Drying should be carried out gradually, to prevent the formation of blisters which result in craters in the final product. Drying temperatures of about 150–275° F. and drying times of about 1–6 minutes will reduce acetone solvent retention to an acceptable level, whereas slightly different ranges may be used for other solvents. In general, no more than about 8% volatiles should remain in the impregnated overlay sheet after drying, with a preferred residual volatile content in the range of about 3–5%. Residual volatile content is measured as the weight loss obtained upon heating a sample of the dried, impregnated overlay sheet at a temperature of 320° F. for 8 minutes.

The dried, resin-impregnated overlay sheets prepared in accordance with this invention may be bent and rolled without cracking, and cut without flaking or chipping, and may be stored for prolonged periods without blocking or advancing in cure.

Decorative laminates may be prepared from these overlay sheets by laminating the overlay sheet to a wood veneer. Wood veneers are normally made of hardwood, such as walnut, mahogany, birch or maple, and are applied commercially in thicknesses of $\frac{1}{16}$ inch, $\frac{1}{28}$ inch, or thinner, since thick veneers are less economical to use. These veneers are generally glued to a core board of the desired thickness, weight and composition, using a strong adhesive. Any of the conventional core boards which are reasonably rigid, have two parallel surfaces, and uniform compressibility may be used. Typical core materials include plywood, hardboard, particle board, flake board, lumber core, cement-asbestos board and gypsum board. The board should be thermally stable at the laminating temperature, or special precautions may be required. For example, if a urea formaldehyde resin binder is present, or the boards are of high moisture content, it is preferred to pre-dry the boards to a minimum moisture and volatile content. Since it is desirable to avoid the formation of steam and other volatiles during lamination, boards such as gypsum board which calcines should be pretreated before lamination.

To prevent warping, either the core board should be balanced with a resin surface on both sides, or the reverse side should be provided during lamination with some inexpensive resin film, typically a sheet of phenolic resin impregnated kraft paper with a glassine paper separator. The type and character of the core board used for veneer will determine the extent to which balancing or equalization is required. All types of hardboard and most plywoods must be balanced to a greater or lesser degree to compensate for the slight resin shrinkage that occurs and to equalize the rate of water absorption through the two faces. Boards which have a high internal bond strength and a high resistance to moisture, or are very thick, or are wood veneered on both faces, may not require additional equalization.

Lamination of the overlay sheet to the wood veneer may be accomplished using a standard platen press with one or more openings. Laminates can be cured with multiple openings either "face-to-face," using a caul finished on both sides, or "back-to-back" using two cauls, each finished on one side only. Either stainless steel or aluminum cauls of any desired finish, such as matte, satin, furniture finish or gloss may be used. The cauls are generally treated with a release agent such as a lauric acid or a silicone. The desired surface finish may also be obtained through the use of release or separating papers such as cellophane or papers coated or treated with release agents such as silicones, which papers are inserted between the caul plate and the resin-impregnated overlay sheet.

The impregnated overlay sheet should be laminated to the wood veneer at a temperature and pressure and for a time sufficient to convert the diallylic phthalate to a thermoset resin. The laminating pressure need only be high enough to consolidate the resin and to provide sufficient resin flow to bond the resin-impregnated overlay sheet to the wood veneer. The necessary pressure will depend upon such factors as the density and surface of the wood veneer, and the resin content and flow characteristics of the impregnated overlay sheet.

Laminating pressures approaching contact pressure, and as high as about 400 p.s.i., have been used successfully. For most laminates a convenient pressure is in the range of about 50–300 p.s.i. If it is desired to laminate at pressures in excess of 350 p.s.i., it may be advisable to use overlay sheets in which the resin flow has been retarded by slightly advancing the cure of the resin during the drying operation, or in which the resin is free of monomer, since high laminating pressures are known to reduce the thickness of the resin film on the laminate.

The laminating temperature should be high enough to activate the catalyst, and to provide a reasonable rate of cure. For commercial operations, high curing temperatures are preferred since they provide shorter curing cycles, and thus increase productivity. In practice, the maximum laminating temperature is generally controlled by the heat stability of the wood veneer and the core board. Curing temperatures of about 400° F. have been used for 5 minutes without charring core boards such as "Masonite," a lignocellulose hardboard. Lower temperatures, of course, require longer curing times; temperatures as low as about 200° F. have been used for prolonged periods. Temperatures in the range of about 275–375° F. are preferred, since within this range the rate of polymerization is reasonable, and no significant decomposition or degradation of the laminate is experienced. Although the laminating time may vary over wide limits depending upon the temperature and pressure, times of about 5–30 minutes are generally employed. Preferably laminating times of about 10–20 minutes are used. It is not necessary to cool the cured laminate in the press before removal.

The following examples, illustrating the novel diallylic phthalate solutions and resin-impregnated overlay sheets and decorative laminates produced therefrom are presented without any intention that the invention be limited thereto. All parts and percentages are by weight unless otherwise indicated.

Example 1

A diallyl phthalate resin-impregnated overlay sheet was prepared as follows: an unpigmented non-woven sheet, 8 mils thick, with a basis weight of 20 pounds per 3,000 square feet and containing 100% polymeric fibers in which the polymer forming units were 95% acrylonitrile and 5% vinyl pyridine, 1.25 inches long and 3 denier, was impregnated by passing at the rate of 10 feet per minute through a saturating solution of the following composition:

| | Parts by weight |
|---|---|
| Diallyl orthophthalate partial polymer | 93 |
| Diallyl orthophthalate monomer | 7 |
| Tertiary butyl perbenzoate | 3 |
| Lauric acid | 3 |
| Acetone | 100–120 |
| Hexa(methylmethylol) melamine | 3 |
| Hydroxyl containing lower alkyl compound | (*) |
| Acetone (to dilute the solution to a specific gravity of 0.910 to 0.925) | 100–120 |

* Identity and amount of lower alkyl compounds are listed in Table I (Columns 1 and 2).

The impregnated overlay sheet was dried for 5 minutes at 230° F. to produce a tack-free sheet having a resin content of 75% and a volatile content of 7%.

Various "lower alkyl compounds" were added to this basic saturating solution in varied amounts to produce the several different solutions indicated in Table I for use in producing a number of impregnated overlay sheets.

Wood veneer decorative laminates were prepared from the dry, resin-impregnated overlay sheets as follows:

The above overlay sheets were laminated to walnut veneered particle boards which had been pre-dried for 10–15 minutes at 320° F. The layup consisted of a slip caul followed by a glassine separator paper, a phenolic-impregnated kraft paper, the walnut veneered particle board, the resin-impregnated overlay sheet and a polished aluminum caul plate. Each layup was cured in a laminating press by heating for 18 minutes at 320° F. under a pressure of 200 p.s.i. The laminar bond of the resulting laminate was tested by cutting it in a closely lined crosshatch pattern with a sharp knife. The results of the interlaminate bond tests are set forth in Table I, the best examples being rated 1, in which no flaking of the resin from the surface or other evidence of poor laminar bond was observed; to a rating of 5 for the poorest samples where there was flaking of the resin and evidence of poor laminar bond. The mar resistance of the laminate was tested by rubbing the surface hard using an Organic Coating Adhesion Tester; the results of the mar resistance test are set forth in Table I. The best rating is 1, where no white mar appeared, to 5 for the poorest samples which showed a white mar.

TABLE I

| Lower alkyl additive | Parts by weight | Inter-laminar bond test * | Mar resistance * |
|---|---|---|---|
| Ethyl | 1 | 3 | 1 |
| Do | 2 | 1 | 1 |
| Isopropyl | 1 | 2 | 1+ |
| n-Propyl | 1 | 3 | 1+ |
| Do | 2 | 1 | 1 |
| n-Butyl | 1 | 1 | 1 |
| Do | 3 | 1 | 1 |
| n-Hexanol | 5 | 1 | 2–3 |
| Do | 1 | 1 | 1+ |
| Allyl alcohol | 1 | 1 | 1+ |
| Do | 2 | 1 | 1 |
| Do | 3 | 1 | 1 |
| Ethylene glycol | 1 | 1 | 1 |
| Do | 2 | 1 | 1 |
| Propylene glycol | 1 | 2 | 1 |
| Glycerine | 1 | 2 | 1 |
| Comparative examples: | | | |
| None | 0 | 1 | 5 |
| n-Octyl | 1 | 5 | 5 |
| Lauryl | 1 | 5 | 5 |
| Octadecyl (mixed) | 1 | 5 | 5 |

* Rating: 1 best to 5 poorest.

Example 2

A series of diallyl phthalate resin-impregnated overlay sheets were prepared as follows: unpigmented, non-woven fabric, 6 mils thick, with a weight basis of 20 pounds per 3,000 square feet, containing 100% polymeric fibers in which the polymer forming units were 95% acrylonitrile and 5% vinyl pyridine, 1.25 inches long and 3 denier, were impregnated by passing at the rate of 10 feet per minute through solutions of the following general compositions whose variations are noted in Table II:

| | Parts by weight |
|---|---|
| Diallyl orthophthalate partial polymer | 93 |
| Diallyl orthophthalate monomer | 7 |
| Tertiary butyl perbenzoate | 3 |
| Lauric acid | 3 |
| Acetone (sufficient to obtain a solution whose specific gravity is 0.910 to 0.925) | 100–120 |
| Hexa(methylmethylol) melamine | (A) |
| Alcohol | (B) |

(A) The amount of hexa(methylmethylol) melamine was added in varied amounts recorded in Table II.
(B) Normal butanol was added in varied amounts as shown in Table II.

The impregnated sheets were dried for 5 minutes at 230° F. to produce a tack-free overlay sheet having a resin content of 75% and a volatile content of 7%.

Wood veneer decorative laminates were prepared from these dry, resin-impregnated overlay sheets as follows: the overlay sheet was laminated to 0.75 inch walnut-veneered particle board which had been pre-dried for 10 minutes at 320° F. The layup consisted of a slip caul followed by a glassine separator paper, a phenolic-impregnated kraft paper, the walnut veneered particle board, the resin impregnated overlay sheet, and a polished aluminum caul plate. Each layup was cured in a laminating press by heating for 18 minutes at 320° F. under a pressure of 200 p.s.i. The laminar bond and mar resistance of the resulting laminates were tested and recorded according to the procedures in Example 1.

TABLE II

| (A)* Hexamethyl methylol melamine | Alcohol | (B)* | Rating Bond strength | Mar resistance |
|---|---|---|---|---|
| 0 | n-Propyl | 2 | 5 | 5 |
| 0 | n-Butanol | 3 | 5 | 5 |
| 3 | do | 5 | 1 | 2 |
| 5 | do | 1 | 1 | 3 |
| 5 | do | 3 | 1 | 3 |
| 10 | do | 5 | 1 | 2–3 |

Rating: 1 best to 5 poorest.
*Parts by weight per 100 parts of resin.

As will be apparent to those skilled in the art numerous modifications and variations of the embodiments illustrated above may be made without departing from the spirit of the invention.

What is claimed is:
1. A modified diallylic phthalate resin solution comprising (a) diallylic phthalate, 85–100% by weight of said diallylic phthalate being partial polymer and the remaining 0–15% being monomer, (b) 0.1–10% by weight, based on diallylic phthalate, of alkylated methylol melamine, (c) a catalytic amount of organic peroxide, and (d) a volatile organic solvent, wherein the improvement comprises 1–3% of a lower alkyl compound having 2–7 carbon atoms in the carbon chain and containing 1–3 hydroxyl groups.
2. A modified diallylic phthalate resin solution of claim 1 in which the lower alkyl compound contains 2–6 carbon atoms in the carbon chain.
3. A modified diallylic phthalate resin solution of claim 1 in which the diallylic phthalate is diallyl orthophthalate.
4. A modified diallylic phthalate resin solution of claim 2 in which the alkylated methylol melamine is selected from the group consisting of hexa(methoxymethyl) melamine and tri(methoxymethyl) tri(methoxyallyl) melamine.
5. The modified diallylic phthalate resin solution of claim 3 in which the lower alkyl compound is selected from the group consisting of methanol, ethanol, isopropanol, normal propanol, normal butanol, normal hexanol, allyl alcohol, ethylene glycol, propylene glycol and glycerine.
6. A dry, diallylic phthalate resin-impregnated overlay sheet comprising an unpigmented, fibrous carrier sheet impregnated with diallylic phthalate, 85–100% by weight of said diallylic phthalate being partial polymer and the remaining 0–15% being polymer, 0.1–10% by weight based on the diallylic phthalate of alkylated methylol melamine, a catalytic amount of an organic peroxide and 1–3% by weight, based on the weight of the diallylic phthalate of a lower alkyl compound, containing 1–3 hydroxyl groups and having 2–7 carbon atoms in the carbon chain.
7. A dry diallylic phthalate resin-impregnated overlay sheet of claim 6 in which the lower alkyl compound contains 2–6 carbon atoms in the carbon chain.
8. A modified diallylic phthalate resin-impregnated overlay sheet of claim 6 in which the diallylic phthalate is diallyl orthophthalate.
9. The dry modified diallylic phthalate resin-impregnated overlay sheet of claim 7 in which the alkylated methylol melamine is selected from the group consisting of hexa(methoxymethyl) melamine and tri(methoxymethyl) tri(methoxyallyl) melamine.
10. The dry modified diallylic phthalate resin impregnated overlay sheet of claim 8 in which the lower alkyl compound is selected from the group consisting of methanol, ethanol, isopropanol, normal butanol, normal hexanol, allyl alcohol, ethylene glycol, propylene glycol and glycerine.
11. A modified diallylic phthalate resin decorative laminate having improved mar resistance which comprises an unpigmented fibrous carrier sheet impregnated with thermoset resin derived from diallylic phthalate and 0.1–10% by weight of alkylated methylol melamine, based on the diallylic phthalate, and 1–3% by weight, based on the diallylic phthalate, of a lower alkyl compound having 2–7 carbon atoms in the carbon chain and containing 1–3 hydroxyl groups, and laminated to a wood veneer.
12. A modified diallylic phthalate resin decorative laminate of claim 11 in which the lower alkyl compound contains 2–6 carbon atoms in the carbon chain.
13. The diallylic phthalate resin decorative laminate of claim 11 in which the diallylic phthalate is diallyl orthophthalate.
14. The diallylic phthalate resin decorative laminate of claim 11 in which the alkylated methylol melamine is hexamethamethylol melamine.
15. The diallylic phthalate resin decorative laminate of claim 11 in which the lower alkyl compound is selected from the group consisting of methanol, ethanol, isopropanol, normal propanol, normal butanol, normal hexanol, allyl alcohol, ethylene glycol, propylene glycol and glycerine.

References Cited
UNITED STATES PATENTS

| | | | |
|---|---|---|---|
| 2,809,911 | 10/1957 | Richardson | 161—232 X |
| 2,977,272 | 3/1961 | Pounds | 260—849 X |
| 3,108,030 | 10/1963 | Taylor | 156—332 |
| 3,154,454 | 10/1964 | Dupuis | 161—232 X |
| 3,208,901 | 9/1965 | Kelley et al. | 161—151 |
| 3,445,312 | 5/1969 | Rider | 161—232 X |

JOHN T. GOOLKASIAN, Primary Examiner

J. C. GIL, Assistant Examiner

U.S. Cl. X.R.

117—155; 156—332; 161—232, 263, 261; 260—31.2, 32.8, 33.4, 33.6, 856

UNITED STATES PATENT OFFICE
CERTIFICATE OF CORRECTION

Patent No. 3,509,019                  Dated April 28, 1970

Inventor(s) Harry H. Beacham

It is certified that error appears in the above-identified patent and that said Letters Patent are hereby corrected as shown below:

Column 2, line 38, "allyated" should read --allylated--.

Column 2, line 41, "akylated" should read --alkylated--.

Column 3, line 25, "10-14" should read --10-40--.

Column 9, line 10, "based on diallylic" should read --based on the diallylic--.

Column 9, line 37, claim 6, "0-15% being polymer" should read --0-15% being monomer--.

Column 10, line 7, claim 10, "isopropanol, normal butanol" should read --isopropanol, normal propanol, normal butanol--.

Signed and sealed this 18th day of April 1972.

(SEAL)
Attest:

EDWARD M. FLETCHER, JR.
Attesting Officer

ROBERT GOTTSCHALK
Commissioner of Patents